United States Patent

Morikawa et al.

[11] Patent Number: 5,084,831
[45] Date of Patent: Jan. 28, 1992

[54] PRINTER AND PRINTING METHOD

[75] Inventors: Takashi Morikawa; Ikunori Yamaguchi, both of Toyokawa, Japan

[73] Assignee: Minolta Camera Kabushiki Kaisha, Osaka, Japan

[21] Appl. No.: 693,704

[22] Filed: Apr. 30, 1991

[30] Foreign Application Priority Data

May 1, 1990 [JP] Japan ................................. 2-116143

[51] Int. Cl.$^5$ ........................................... G06K 15/00
[52] U.S. Cl. .................................................. 395/116
[58] Field of Search ................................ 364/518-520, 364/235 MS File, 930 MS File, 944.92 MS File, 957.1 MS File, 957.8 MS File, 957 MS File; 358/296, 300; 355/308, 311

[56] References Cited

U.S. PATENT DOCUMENTS

| 4,646,259 | 2/1987 | Lincoln et al. | 364/900 |
| 4,716,544 | 12/1987 | Bartley | 364/900 |
| 4,742,483 | 5/1988 | Morrell | 364/900 |
| 4,933,772 | 6/1990 | Ikenoue et al. | 358/300 |
| 4,954,910 | 9/1990 | Ueno | 358/296 |
| 5,029,114 | 7/1991 | Makiguchi | 364/518 |

Primary Examiner—Arthur G. Evans
Attorney, Agent, or Firm—Burns, Doane, Swecker & Mathis

[57] ABSTRACT

A new printer having a memory for storing dot image data to be printed, wherein two modes, that is, a full bit map mode for storing a page of data and a strip map mode for a smaller size of data than a page of data is stored alternately in two memory areas in the memory are provided, and the full bit map mode or the strip map mode is selected according as the size of image data is smaller than or not. In the full bit map mode, the bit data are sent to the printing means after all the bit data of a page has been stored in the bit map memory, while in the strip may mode an image of one page is divided into a plurality of image portions and the bit data is written/read to and from the bit map memory in the unit of image portion.

In a new printing method, the size of an image of one page to be printed is obtained first. Then, if the obtained size of image is smaller than the capacity of a bit map memory for storing bit data, the full bit map mode is set; otherwise the strip map mode is set. Next, bit data received from the bit map memory is printed on a sheet of paper.

12 Claims, 11 Drawing Sheets

Fig.6

| | |
|---|---|
| 1st word | source address |
| 2nd word | source width \| source address |
| 3rd word | flag \| source height |
| 4th word | band buffer address |

Fig.7

| 0 | 1 | 2 | 3 | 4 | 5 | 6 |
|---|---|---|---|---|---|---|
| 7 | 8 | 9 | 10 | 11 | 12 | 13 |
| 14 | 15 | 16 | 17 | 18 | 19 | 20 |
| 21 | 22 | 23 | 24 | 25 | 26 | 27 |

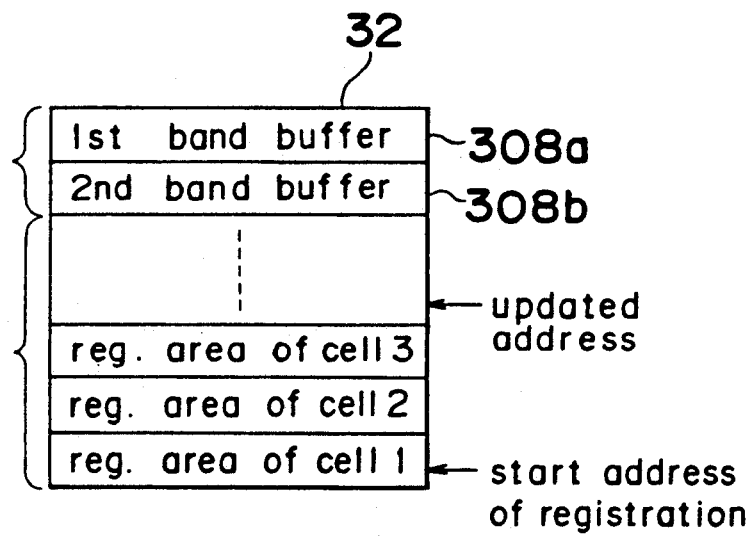

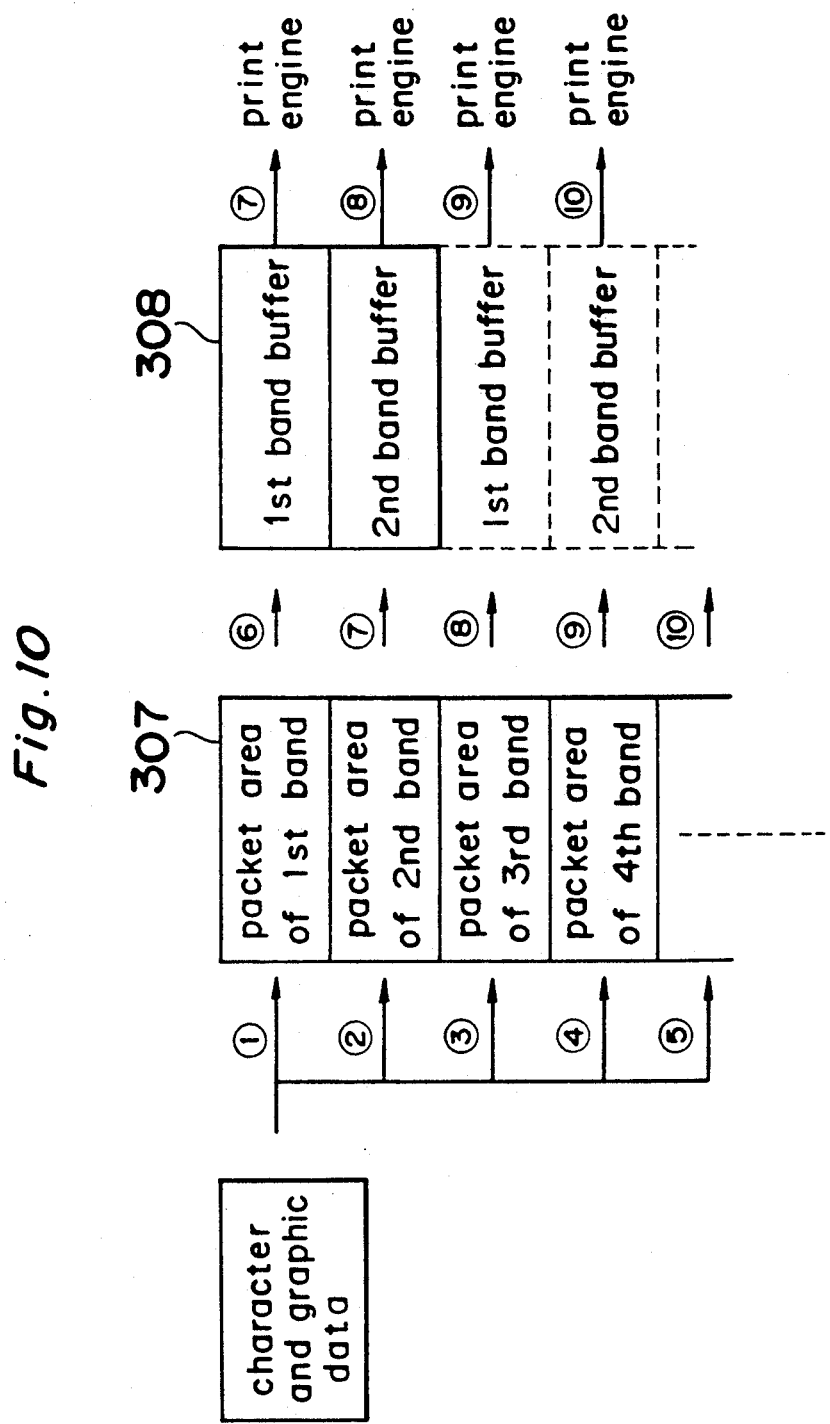

PRINTER AND PRINTING METHOD

BACKGROUND OF THE INVENTION

1. Field of the Invention

The present invention relates to a printer with a memory for storing bit image data, particularly, a printer which prints data fed from a data processing unit such as a host computer or the like and a printing method thereof.

2. Related Art

Conventionally, two printing methods has been applied to a printer having a memory for storing bit image data: a full bit map method whereby data of one page to be printed are written in a bit map memory having a one-page storage capacity, and a strip map method whereby two bit map memories, called as band buffers into which a portion of one-page data is able to be stored, are alternately used to write and read the data portions.

According to the former full bit map method, an image written in the bit map memory can be printed without further processing, so that the processing of data is simple and printing is carried out at high speeds. In contrast, the latter strip map method needs more complicated processing. It takes a considerable time to analyze particularly vector graphic data, from the receipt of data to the start of printing thereof. As a result, the printing speed according to the strip map method may be decreased as a whole. Moreover, in the case of a page printer, e.g., a laser printer, it may happen that the bit-mapping (writing) of data in the memory is unable to catch up with the printing speed, thereby causing such a trouble as missing of an image.

In the meantime, it has been developed in recent years to add an optional memory to a printer so that the strip map method can be changed to the full bit map method, with an aim to improve the printing efficiency.

Even in the case where the full bit map method is applicable to a printer, if the storage capacity of the memory is limited, the full bit map method is effective only for processing the data of a predetermined image size, and should be switched to the strip map method for the data having a size exceeding the predetermined image size.

For example, if the full bit map method is used for an image of A4 size (wherein the actual image area is 7 × 10 inches) with the resolution of 300 dots per inch in longitudinal and lateral directions, the capacity of the memory of $(7 \times 300) \times (10 \times 300) \div 8 \div 1024 \approx 0.77M$ bytes is needed. Therefore, if the printer has a memory of 0.5M byte capacity, the full bit map method is useful only for half a page (namely, A5 image size, 7 × 5 inches), and an optional memory of 0.3M byte capacity should be added. When the capacity is 0.8M bytes in total, the full bit map method can be used for A4 size.

However, if the same printer is used, the full bit map method is not applicable to printing of B4 image size due to deficiency of memory capacity. Although it is possible in theory to use the full bit map method to any size of image if the memory capacity is increased without limit by disregarding the limit of hardware of the printer such as a paper feed system or the like, it is not practically available owing to the cost for providing a memory having an unnecessarily large capacity in order to adopt the full bit map method. Furthermore, even if the memory capacity is increased, control such as the management of address becomes inevitably complicated.

Therefore, addition of a memory cannot be said as a fundamental solution of improving the printing efficiency, and it is required for practical purposes that the full bit map method can be switched to the strip map method.

Conventionally, in a printer wherein the full bit map mode and the strip map mode are provided, the full bit map mode can be switched to the strip map mode through manual setting of the printer before the printer is started. Accordingly, once the full bit map mode is set for the printer, all the data to be printed cannot be printed if the amount of the data exceeds the capacity of the bit map memory, and only the data stored in the memory can be printed. On the contrary, once the strip map mode is set, even if all the data to be printed can be accommodated in the bit map memory or the full bit map method is utilizable, printing is executed by the strip map method, thereby lowering the printing speed and printing efficiency, or generating missing of a portion of the image.

SUMMARY OF THE INVENTION

An essential object of this invention is to provide a printer having a bit map memory of a predetermined capacity, which printer is designed to switch automatically a full bit map method and a strip map method in accordance with designated printing image size.

In a printer and printing method thereof according to the present invention having a memory for storing dot image data to be printed, two modes, that is, a full bit map mode for storing a page of data and a strip map mode where a smaller size of data than a page of data is stored alternately in two memory areas in the memory, are provided, and the full bit map mode or the strip map mode is selected automatically by comparing the size of an image to be printed with the capacity of the memory.

It is an advantage of the present invention that such a situation can be prevented that an image is printed in the strip map mode although the full bit map mode can be adopted, without lowering the printing speed and deteriorating the printing quality.

It is another advantage of the present invention that the full bit map mode can not be erroneously selected when it is impossible to use the full bit map mode to cause the missing of a part of image.

It is a third advantage of the present invention that an image larger than the memory capacity can be printed without adding more memories.

BRIEF DESCRIPTION OF THE DRAWINGS

This and other objects and features of the present invention will become apparent from the following description taken in conjunction with a preferred embodiment thereof with reference to the accompanying drawings, in which:

FIG. 6 is a diagram for illustrating the concept of the structure of a packet;

FIG. 7 is a diagram of an example when a cell map is formed in a predetermined image area;

FIG. 8 is a diagram for schematically showing the concept of a registering area in a video memory according to a strip map method.

FIG. 9 is a diagram of an address table registering each cell data in the strip map method;

FIG. 10 is a diagram for showing the printing process in the strip map method;

DETAILED DESCRIPTION OF PREFERRED EMBODIMENT

Figure 1:
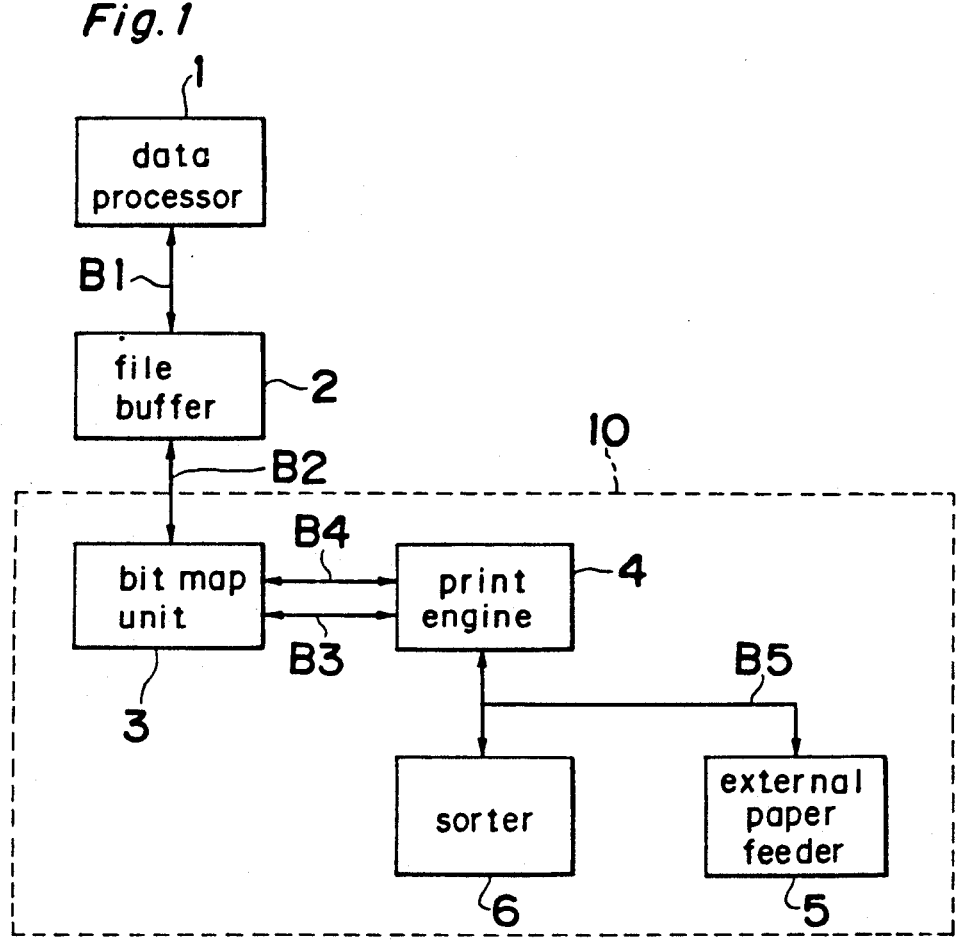
FIG. 1 is a block diagram of a printer system according to a preferred embodiment of the present invention.

Before the description of the present invention proceeds, it is to be noted here that like parts are designated by like reference numerals throughout the accompanying drawings.

A preferred embodiment of the present invention will now be described below with reference to the accompanying drawings.

(a) Structure of Electrophotographic Printer

First, the structure of a printer and a controller will be explained. FIG. 1 shows the structure of a system including a printer system 10 according to a preferred embodiment of the present invention wherein two modes, a full bit map mode and a strip map mode, are provided, and the two modes are switched automatically by comparing the size of an image to be printed with the capacity of a memory for storing bit data of the image.

A data from a data processing unit 1 such as a host computer is not directly inputted to the printer system 10 in order to improve the throughput of the data processing unit 1. It is general that the data is temporarily stored in an external file buffer 2 and then outputted to the printer system 10.

The printer system 10 consists of a bit-map data processing unit 3, a print engine 4 using a laser for electrophotographic process, and such attachments as an external paper feeder unit 5 and a sorter 6.

Figure 2:
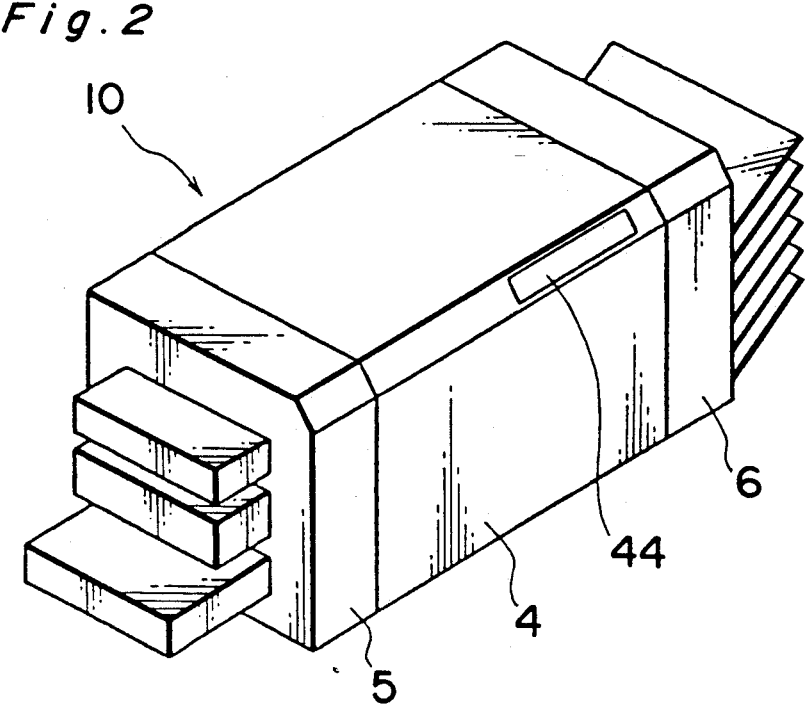
FIG. 2 is a perspective view of the printer system.

An outer appearance of the printer system 10 is illustrated in FIG. 2. The bit-map data processing unit 3 is housed within the print engine 4 which is connectable with the external paper feeder unit 5 and the sorter 6 as accessories. Moreover, there is mounted an operating panel 44 at the front in the upper part of the print engine 4 in order to indicate the status of the system or to carry out simple operations.

Figure 3:
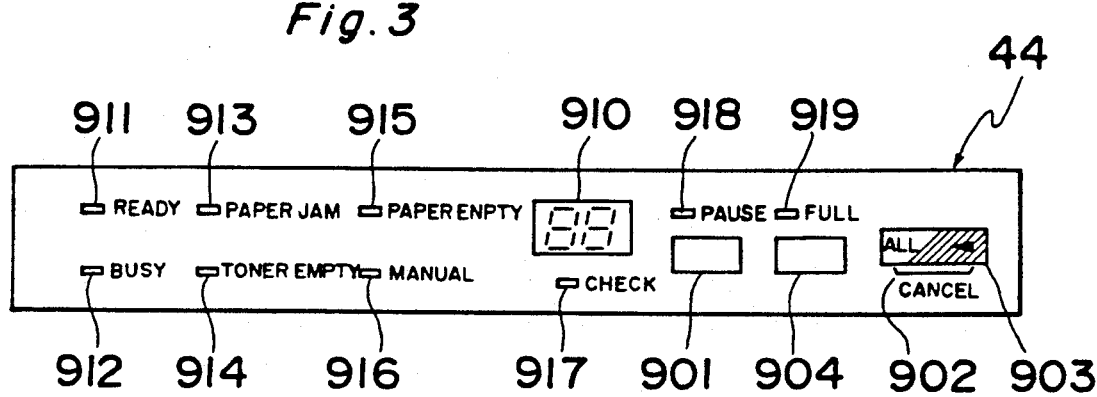
FIG. 3 is a plan view of an operating panel.

FIG. 3 shows the operating panel 44 in detail. Reference numerals 901-904 represent input keys, while reference numerals 910-919 represent display elements. More specifically, the key 901 is a PAUSE key to temporarily stop printing. The key 902 is a TEST key to start TEST printing. The key 903 is a shift key and becomes a CANCEL key to interrupt printing when it is depressed simultaneously with the key 902. The key 904 is a switching key to manually switch between the full bit map mode and strip map mode. When the key 904 is depressed, the display element 919 is turned on or off. The full bit map mode is selected when the display element 919 is kept on.

Figure 4:
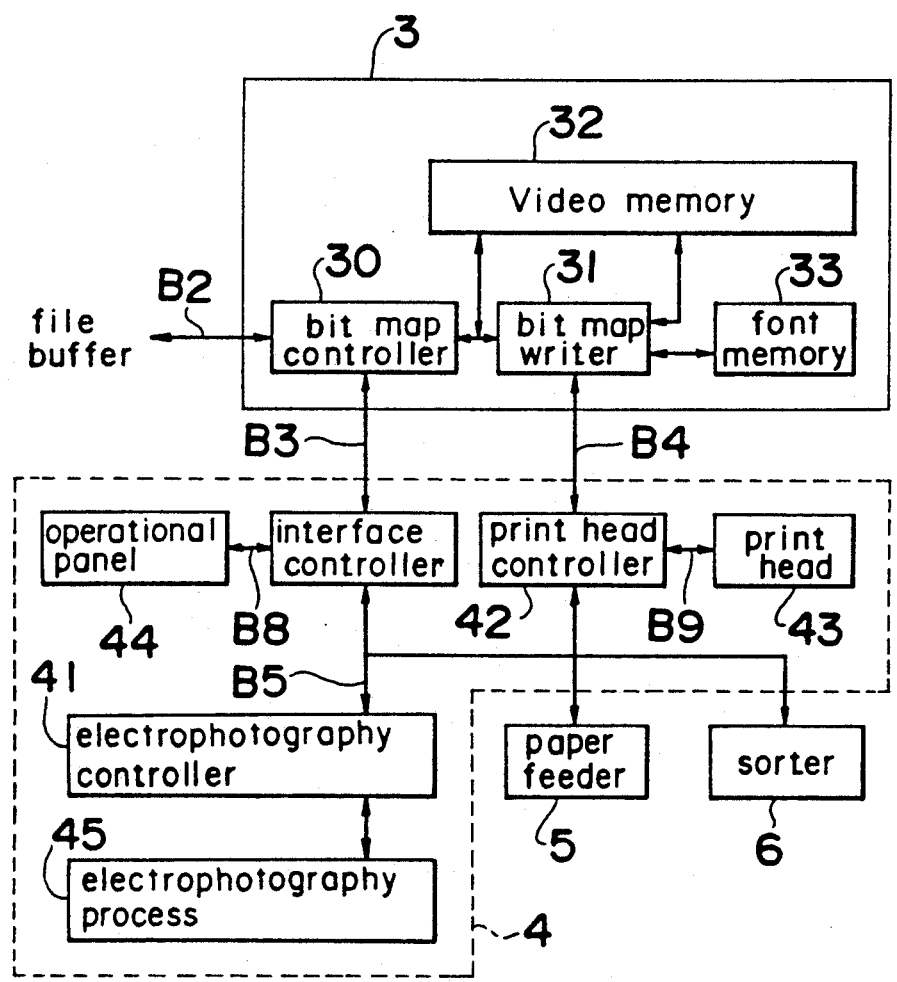
FIG. 4 is a schematic block diagram of the printer system.

FIG. 4 is a schematic block diagram of the printer system 10. The bit-map data processing unit 3 includes a bit map controller 30, a video memory 32, a bit map writer 31 for writing data into the video memory 32 and, a font memory 33 for storing predetermined fonts. The video memory 32 is used as a bit map memory when the full bit map mode is selected, while when the strip map mode is selected, the video memory 32 is used as a memory area of a band buffer as a strip map memory and a packet buffer (which will be described later) to temporarily register data. The bit-map data processing unit 3 is connected to the print engine 4 via a bus B3 for control data such as the number of paper sheets and via a bus B4 for image data.

The print engine 4 mainly consists of three controllers 40, 41, 44. More specifically, an interface controller 40 controls the control data sent from the bit-map controller 30, the operating panel 44 and the timing of the whole print engine 4 through an internal bus B5. An electrophotographic controller 41 controls an electrophotographic processing part 45 in accordance with the data sent from the interface controller 40 via the internal bus B5. Further, a print head controller 42 controls the light emitting of a semiconductor laser of a print head 43 or the rotation of a polygon motor (not shown) in accordance with the information sent from the interface controller 40 via the internal bus B5 in order to write the image data from the bit-map writer 31 via the internal bus B4.

The external paper feeder unit 5 and the sorter 6 are also controlled by the interface controller 40 through the internal bus B5.

The printing data supplied from the data processing unit 1 is written to an actual printing image in the video memory 32 of the bit-map processing unit 3, and outputted to the print engine 4. The print engine 4 records the image on the photoconductor while modulating the laser beam in accordance with the data received from the bit-map data processing unit 3, and transfers the image to a paper.

The data supplied from the data processing unit 1 includes codes for controlling a format or for setting a mode of the print engine 4 besides printing data and are analyzed in the bit-map data processing unit 3.

The print engine 4 controls the electrophotographic system and the timing of feeding a paper, besides the control of recording as mentioned above. The control of the print engine 4 is in the same manner as an electrophotographic copying machine except a scanning system not included in the printer.

(b) Bit-map Controller

Figure 5:
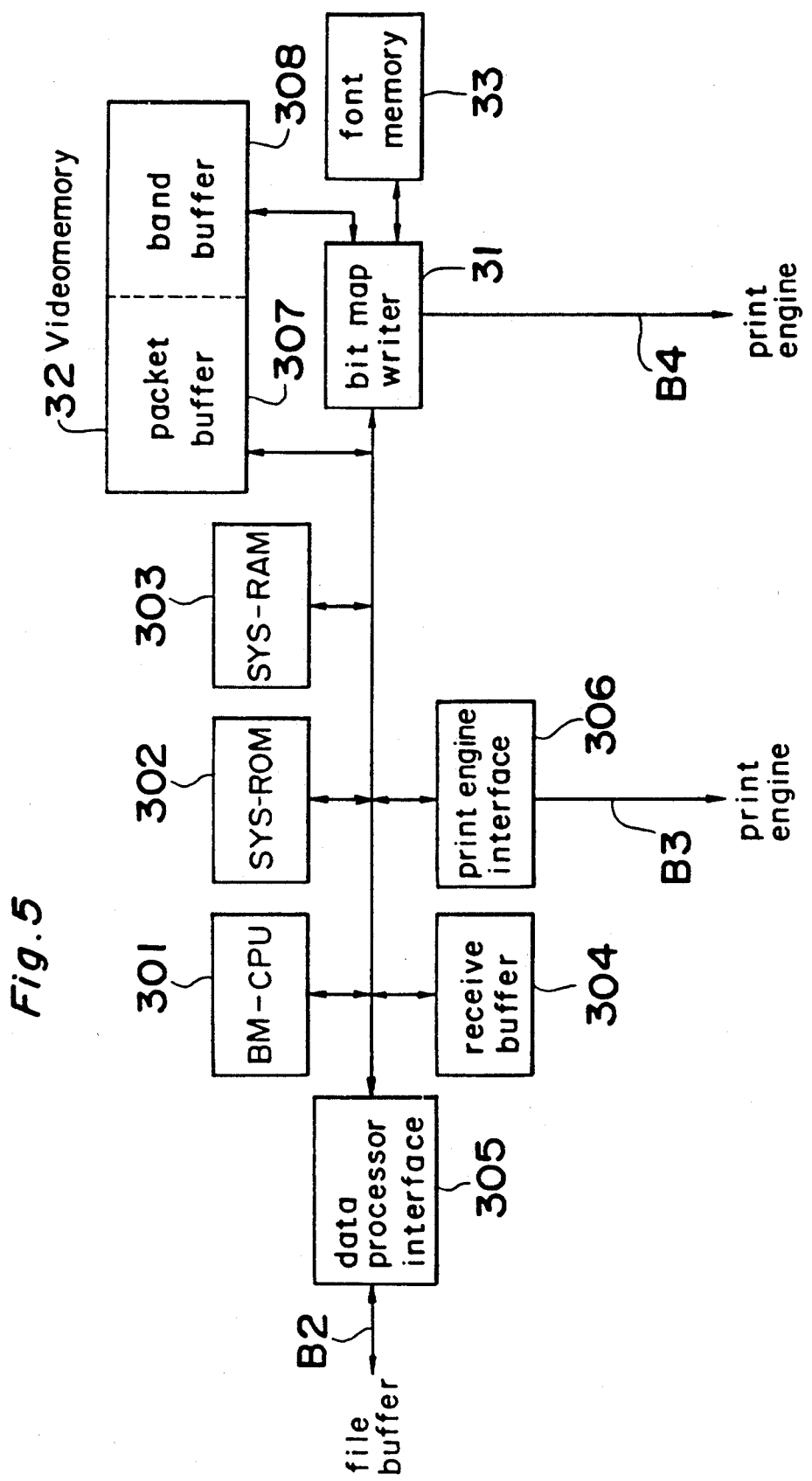
FIG. 5 is a block diagram of a bit-map data processing unit.

FIG. 5 is a block diagram showing the bit-map data processing unit 3 in detail. The bit-map controller 30 includes several blocks connected with each other via an internal bus. A BM-CPU 301 is a controlling part which is the center of the bit-map data processing unit 3, communicating with the data processing unit 1 and the external file buffer 2 via a data processing unit interface 305 and analyzing the protocol of the received data or converting the printing data. Moreover, the BM-CPU 301 controls the bit-map writing part 31 and the print engine 4 through a print engine interface 306. A system-ROM 302 stores programs for the BM-CPU 301. A system-RAM 303 is a memory area for the BM-CPU 301 to be used as a stack area and to store basic flags.

A receive buffer 304 is a buffer for communication with the outside (the data processing unit 1 and the file buffer 2), which is intended to make the communication possible between the BM-CPU 301 and the data processing unit 1 even when they are connected asynchronously.

Characters (fonts) and graphic images are plotted actually by the bit-map writer 31. The data sent to the bit-map writer 31 include an address in the font memory 33 for a character stored in the font memory 33, and an address in the video memory 32 for down-loaded font characters if the down-load area is provided within the video memory 32, and a graphic data (raster data and vector data) for graphic image. Any of the above-mentioned data requires parameters such as a writing address to the video memory 32 or the like. The operation of the bit-map writer 31 will be depicted later with reference to a flowchart.

The print engine interface 306 is an interface with the print engine 4, exchanging JOB control commands like print command through an interface of the print engine 4 and the bus B3.

When the full bit map mode is employed, the whole area of the video memory 32 is used as a bit map area. On the other hand, when the strip map mode is selected, the whole area of the video memory 32 is divided into two, namely, a packet buffer 307 and a band buffer 308 which will be described later.

(c) Printing according to the Strip Map Method

It will be briefly described below in relation to a control flow to be described later how to process the printing data according to the strip map method which can be selected when the full bit map method cannot be used.

Since the full bit map method is already well known, the description thereof will be abbreviated here.

[c-1] Structure of Packet (intermediate code)

In the strip map method, a management data called as a packet is once formed from either of the character data and graphic data, and it is registered in the packet buffer 307 within the video memory 32. The packets are referred to when the data is written in the band buffer 308.

FIG. 6 is a conceptual view of the structure of a packet, which consists of four words. The first word stores a less significant address of a source data (pattern data) to be written in the band buffer 308 (a font pattern storing address within the font memory in the case of characters, and an address of a graphic registering area for each cell provided in the packet buffer 307 in the case of graphic image), while the second word stores the width and a more significant address of the source data. The third word stores control flags indicating the kind of the printing data and the height of the source data, while the fourth word stores an address in the band buffer 308 in which the source data is written.

[c-2] Temporary Registration of Graphic Pattern Data

In the case of graphic data, packets are formed as described above, and moreover, a cell map which will be described below is formed and the pattern data is temporarily registered in a registering area set in the packet buffer 307 within the video memory 32. This temporary registering is performed on the one-page graphic pattern data for each cell. The graphic pattern data is not written in the band buffer 308 until all the data is once completely registered in the registering area.

FIG. 7 shows the above-mentioned cell map. The one-page graphic pattern data is divided into sections called as cells of equal size (for example, 160 dots × 160 dots), and each cell is consecutively numbered.

FIG. 8 is a diagram of the registering area of each cell formed in the band buffer 308, consisting of a first band buffer 308a and a second band buffer 308b, and formed in the packet buffer 307. The registering areas are provided corresponding to the cells, and accordingly the number of the registering areas is equal to that of the cells. The pattern data in each cell is temporarily registered in the corresponding registering area, and at the same time, packets are formed and registered in the packet buffer 307. In other words, the graphic data are temporarily registered besides packet data in the packet buffer 307 for each cell in the registering area of each cell.

Concretely, a cell number is obtained from the printing position of the graphic pattern in one page (position of absolute coordinates), and a relative address which is the upper limit of the registering area of the packet buffer 307 is calculated from the cell number. The pattern is written at the position of the calculated relative address. The relative address is registered in a registering table (refer to FIG. 9) corresponding to the cell number. Therefore, the registering address of a cell not yet registered is zero.

Through the repetition of the above-described sequence of operations, all the cells are stored in the registering areas in the packet buffer 307 of the video memory 32.

Since the relative address of the registering area is stored as a source address in the packet of each cell, it is possible to find the address of the registering area of the graphic pattern data by referring to the packet. The graphic pattern data is written from this address to the band buffer 308.

Accordingly, the graphic pattern data are divided into cells and temporarily registered in the registering areas for each cell and they are managed by packets, as described above, so that the graphic pattern data as well as the character data can be written at high speeds to the band buffer 308.

[c-3] Development to Band Buffer

In FIG. 10, the writing of data in the first and second band buffers 308a, 308b is shown schematically. In this case, all the printing data of one page is temporarily registered in the registering area and are converted to packets, and then the data are written in the band buffers 308a and 308b.

As described earlier, according to the strip map method, the character and graphic data of one page is all converted to packets. The graphic data are divided into cells and packets are formed for each cell. The pattern data of each cell is registered in the registering area of the packet buffer 307. The packets are stored in the packet buffer 307 by a unit number which can be written into the first band buffer 308a or the second band buffer 308b, thereby constituting packet areas of a first band, a second one, a third one and so on.

FIG. 10 will be described in detail below.

I) Pattern data in the font memory 33 or in the registering area are written into the first band buffer 308a with reference to the packet area of the first band in the packet buffer 307.

II) Pattern data are then written into the second band buffer 308b with reference to the packet area of the second band in the packet buffer 307.

III) The content in the first band buffer 308a is outputted to the print engine 4, which in turn forms a latent image on the photoconductor in correspondence with the content.

IV) Similarly, the content in the second band buffer 308b is outputted to the print engine 4. At the same time, pattern data are written into the vacant first band buffer 308a with reference to the packet area of the third band in the packet buffer 307.

V) When the content stored in the second band buffer 308b is completely outputted to the print engine 4, since the pattern is already completely written in the first band buffer 308a, the content of the first band buffer 308a is continuously outputted to the print engine 4, while simultaneously, pattern data are written into the second band buffer 308b which has become vacant, with reference to the packet area of the fourth bad of the packet buffer 307.

(VI) The pattern data is subsequently repeatedly written alternately into the band buffers 308a, 308b, 308a, 308b, ..., by referring to the packet areas of the fifth band, the sixth one, the seventh one, the eighth one, ..., and outputted to the print engine 4 from the band buffers 308a, 308b. In this manner, the printing according to the strip map method is completed.

The actual sequence or order of the procedures is expressed by encircled numerals in FIG. 10.

Although the diagram in FIG. 10 is illustrated as if the number of areas were increased one by one in the video memory 32 for the convenience of the explanation, only two band buffers 308a and 308b are provided actually in the band buffer 308 in the video memory 32 because writing and reading of the printing data are alternately conducted for the band buffers 308a, 308b.

(d) Flow of Bit Map Control

The operation of the printer system will be explained with reference to the flowcharts of FIGS. 11 through 15.

Main Routine

Figure 11A:
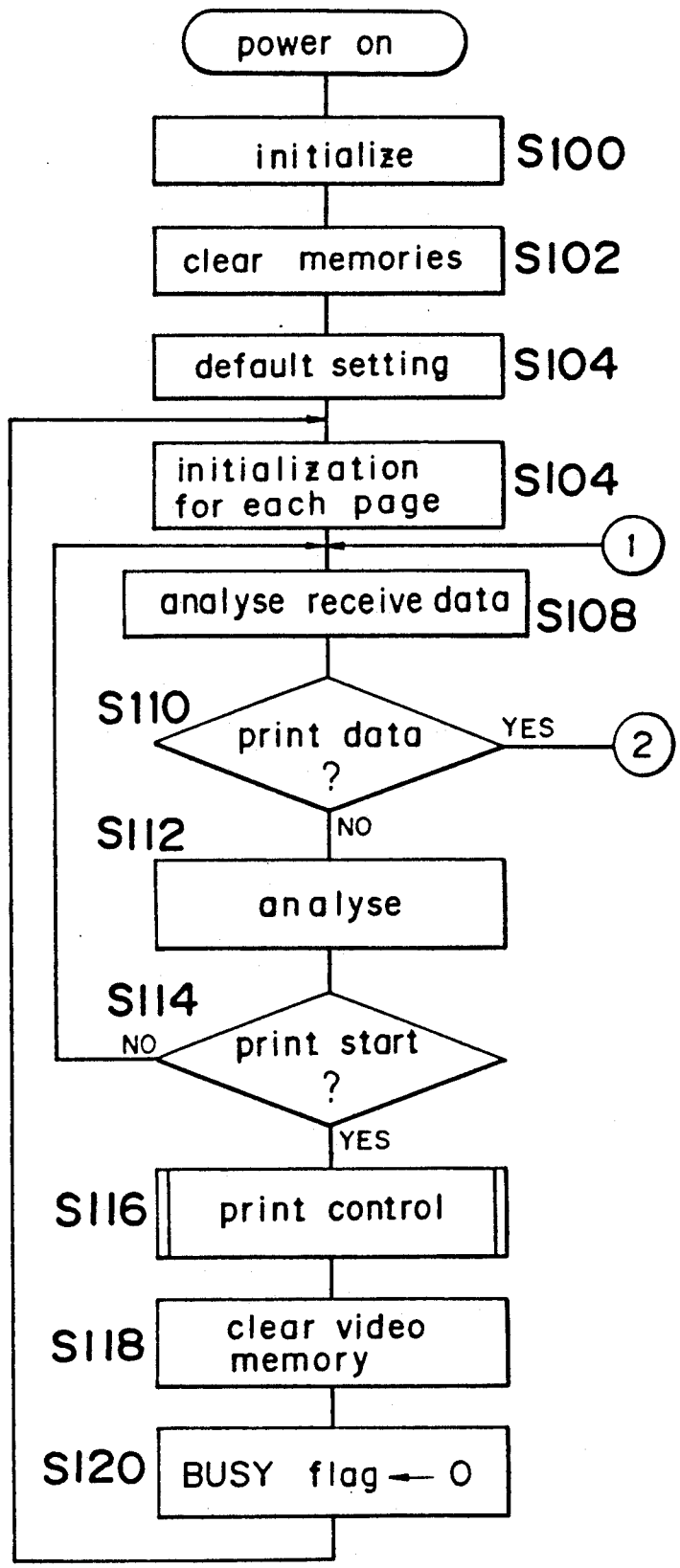
FIGS. 11A and 11B are flowcharts of a main routine of the bit-map data processing unit.
Figure 11B:
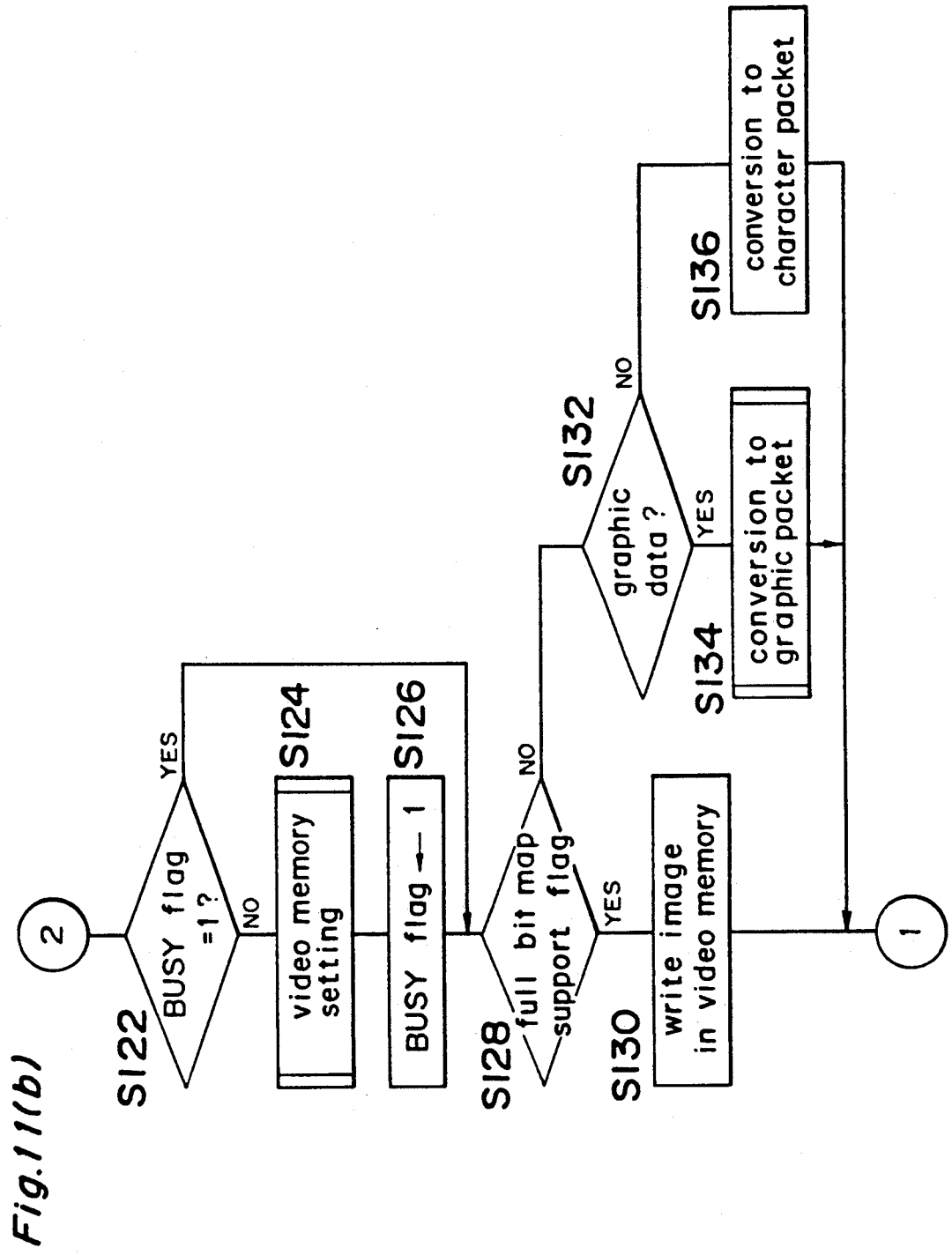

The main routine of the bit-map data processing unit 3 will be understood from FIG. 11.

Upon supply of electric power, the internal of the BM-CPU 301 is initialized (step S100). Then, the work area of the SYS-RAM 303, the video memory 32 are cleared (step S102) and the initialization is executed in accordance with the default setting (step S104).

Figure 12:
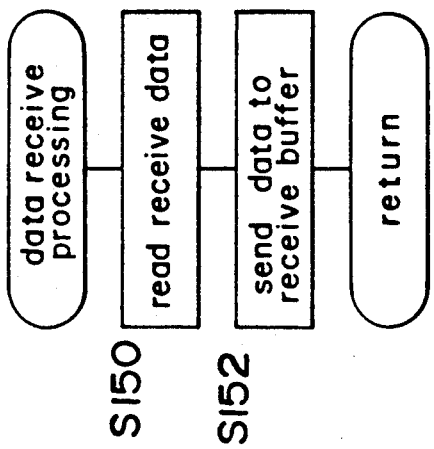
FIG. 12 is a flowchart of an interruption routine of the receipt of data.

The initialization for each page such as the initialization of a packet buffer and the formation of a cell map is performed (step S106). As shown in FIG. 12, data are asynchronously received from the host computer 1 (step S150), and outputted to the receive buffer 304 (step S152). In FIG. 11, a received data is read from the receive buffer 304 and is analyzed (step S108).

Figure 13:
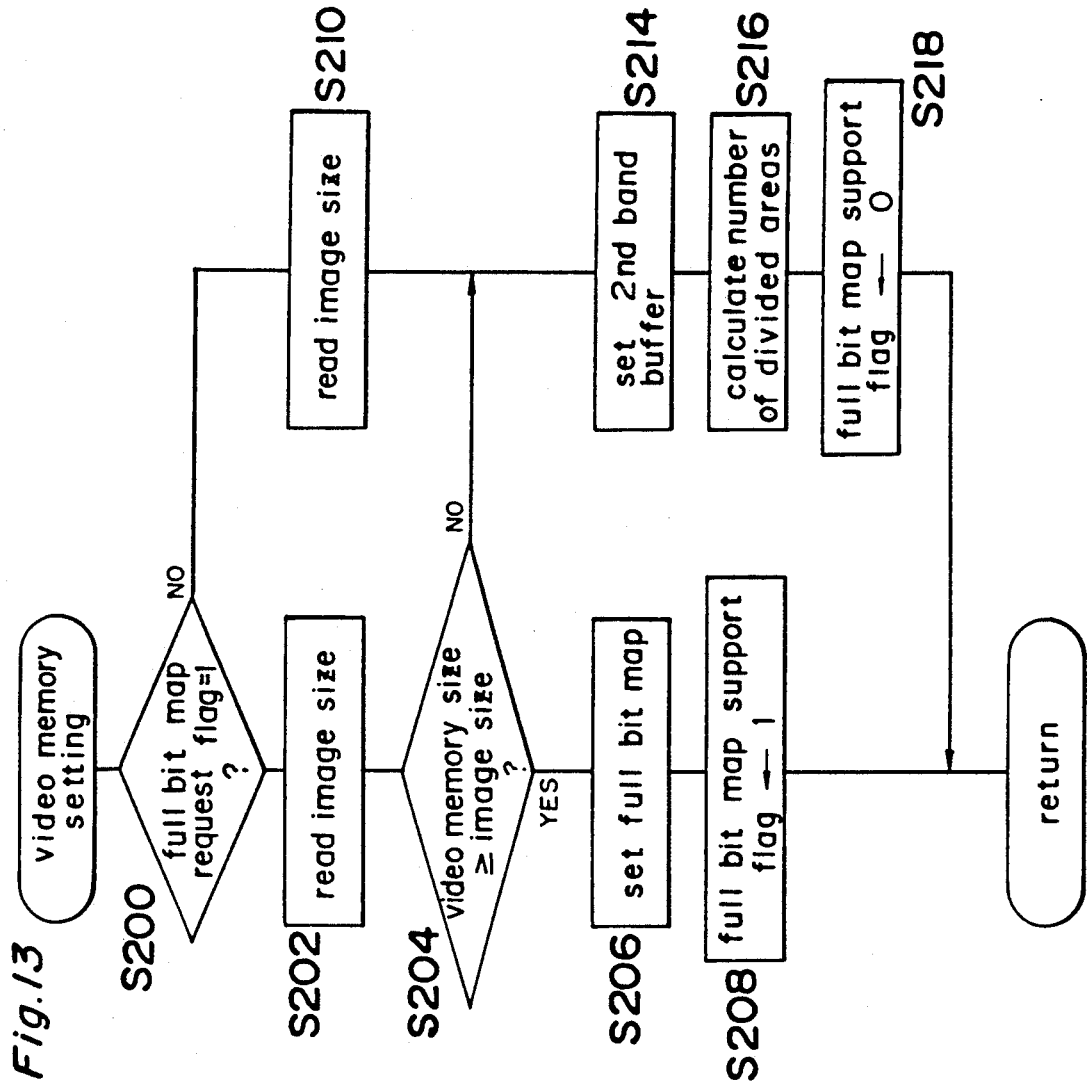
FIG. 13 is a flowchart of a setting routine of the video memory.

If the received data is decided to be a printing data (YES at step S110) and if a BUSY flag, which indicates that the image size is already confirmed, OFF ("0")(NO at step S122), in other words, if the image size has not been read yet, a routine of video memory setting for selecting the full bit map method or the strip map method is carried out (step S124, refer to FIG. 13). Then, the BUSY flag is turned to be ON ("1")(step S126), and the flow proceeds to step S128. On the other hand, if the image size is already confirmed (YES at step S122), the flow proceeds directly to step S128.

If a full bit map support flag is decided to be ON ("1") showing that the full bit map mode is set (YES at step S128), it is not necessary to form a packet, so that the data is written in the video memory 32 for a full bit map (step S130). Then, the flow returns to the analysis of received data (step S108) again.

If the full bit map support flag is decided to be OFF (NO at step S128), i.e., the strip map mode is set, and if the received data is decided to be graphic data (YES at step S132), a graphic packet is formed (step S134, refer to FIG. 14), while if the received data is decided to be a character data (NO at step S132), a character packet is generated (step S136). Thereafter, the flow returns again to the analysis of received data (step S108).

If the received data after the analysis (step S108) is decided not to be a printing data (NO at step S110), i.e., if it is decided to be a control code, the code is analyzed and subjected to the corresponding processing (step S112). Then, the flow returns to step S108 except when the control code is decided to be a request to start printing (NO at step S114). IF the code is decided to be a request to start printing (YES at step S114), printing control processing (step S116, refer to FIG. 15) is performed to actuate the print engine 4. Moreover, in the full bit map mode, the content of the video memory 32 is outputted to the print engine 4, while, in the strip map mode, the data is written in the first band buffer 308a and in the second band buffer 308b from the registering area with reference to the packets in the packet buffer 307 as the data is outputted from the band buffers 308a, 308b to the print engine 4, that is, the print control process is carried out (step S116).

Upon completion of printing, the video memory 32 is cleared for preparing the printing of a next page (step S118), the BUSY flag is turned OFF ("0")(step S120), and the flow returns to the initialization for each page (step S106).

Routine of Video Memory Setting

FIG. 13 illustrates a routine to set the video memory as designated as step S124 in FIG. 11.

It is first decided if a full bit map request flag is decided to be ON ("1") or not (step S200). The full bit map request flag may be turned ON/OFF by a predetermined protocol in the received data, or through the full bit map / strip map switching key 904 of the operating panel 44. The method how to turn the request flag ON/OFF does not restrict the present invention. In the instant embodiment, the flag is turned ON/OFF with the switching key 904. Further, when the full bit map mode is requested, a switch of the full bit map mode / strip map mode is performed priorly by reading the image size indicated by the data processing unit 1 and stored in the receive buffer 304.

In either case whether the full bit map request flat is ON or OFF at step S200, the image size is read from the receive buffer 304 (step S202, step S210). If the request flag is decided to be turned ON ("1") and the capacity (size) of the video memory 32 is decided to be larger than the image size to be read (YES at steps S200 and S204), it is possible to print by using the full bit map method. Therefore, the video memory 32 is set as the full bit map of the read image size (step S206), and the full bit map support flag is turned ON indicating that the full bit map is defined as an image buffer (step S208). Thereafter, the flow returns to the main flow.

If the full bit map request flag is decided to be OFF (NO at step S200) or the capacity of the video memory 32 is decided to be smaller than the image size (NO at step S204), first and second band buffers each having the capacity of n lines are set (step S214). Next, the number of divided areas is calculated (image size÷n lines) (step S216), and the full bit map support flag is turned OFF (step S218), and the flow returns to the main flow.

According to this flow, when the full bit map request flag is ON, the image size is compared with the capacity of the video memory 32 to find whether the full bit map method is possible. The full bit map mode is employed when it is possible, or the strip map mode is used when the video memory lacks enough capacity. Accordingly, the most efficient printing mode can be automatically selected at all times. Although the strip map mode is selected according to this flow when the full bit map request flag is OFF, the present invention is not restricted to this example, and it may be possible to switch the full bit map mode / strip map mode through comparison of the image size with the capacity of the video memory irrespective of the full bit map request flag. Further, for example, when a part of the video memory 32 is secured as a down-load area, such a necessity to select the strip map mode may arise even if the capacity of the video memory is larger than the image size. In such a case, therefore, the remaining area of the video memory may be compared with the image size at step S204, thereby the flow proceeds directly to step S214 if the image size is decided to be larger.

Routine of Graphic Packet Forming

According to the strip map method as described above, an one-page image is divided into a predetermined number of lines (n) in the scanning direction, and the video memory 32 has two bit map memories (band buffers 308a, 308b) each having the capacity of n lines. In the cases of the graphic data and of the character data, the content of the registering area and the font memory 33 are written in the band buffers, respectively, by referring to the content of the packets of the packet buffer 307 in the other area of the video memory 32.

Figure 14:
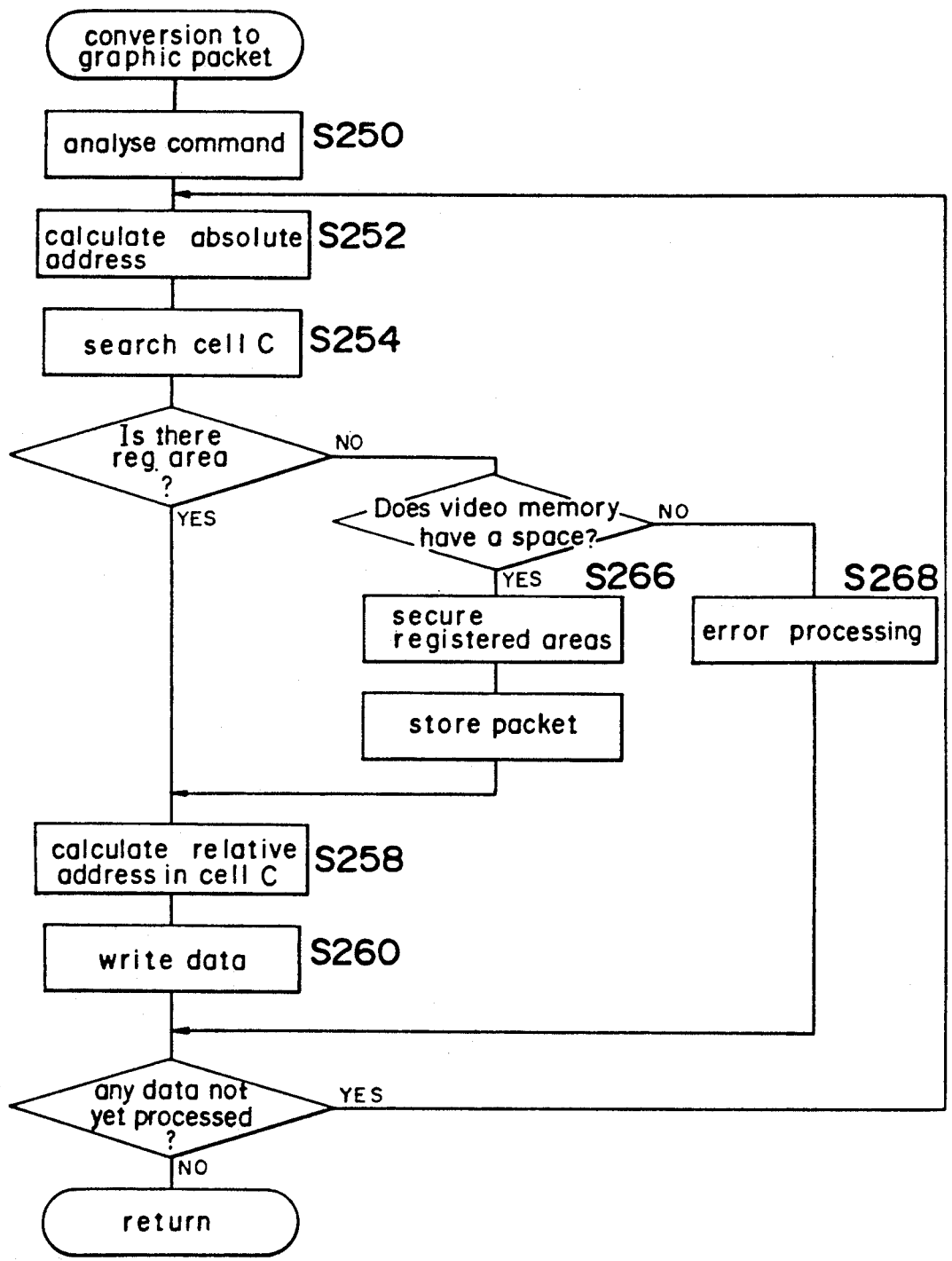
FIG. 14 is a flowchart of a graphic packet forming routine.

FIG. 14 shows a flow to form packets for the graphic data of step S134 of FIG. 11 which becomes necessary when the strip map mode is employed. As mentioned above, in the case of the graphic data, not only the packets are formed, but also the pattern data is registered in the registering area in the packet buffer 307 for each cell so as to make the data processable in a similar manner to the character data. It is needless to say that the packets alike are registered in the packet buffer 307.

The graphic data includes raster data and vector data either of which contains bit map commands. First, a command is analyzed (step S250), and the absolute coordinates of the bit map pattern (an actual printing position in one page) are obtained (step S252). Then, a cell number C corresponding to the position of the coordinates is searched from the cell map (refer FIG. 7) which has been formed at the initialization of step S106 in FIG. 11 (step S254).

Then, it is confirmed if the registering area corresponding to the cell number C is secured in the packet buffer 307 in the video memory 32 from the fact whether or not the address is written in the address table (refer FIG. 9) of the cell number C (YES at step S256). A relative address to be written into the registering area is calculated (S258) and the bit image is written into the registering area (S260). The process is continued so long as the data to be processed remains (YES at step S262).

If the registering area is not secured (NO at step S256), it is next decided if a vacant area enough to secure the registering area in the packet buffer 307 is present (step S264). If it is decided that such a vacant area exists (YES at step S264), a registering area is secured (step S266). After the packets are stored in the packet buffer 307 (step S267), the flow proceeds to step S258. If there is no such vacant area in the packet buffer 307 (NO at step S264), a prescribed error processing is performed (step S268), and the flow proceeds to step S262.

Print Control Routine

Figure 15:
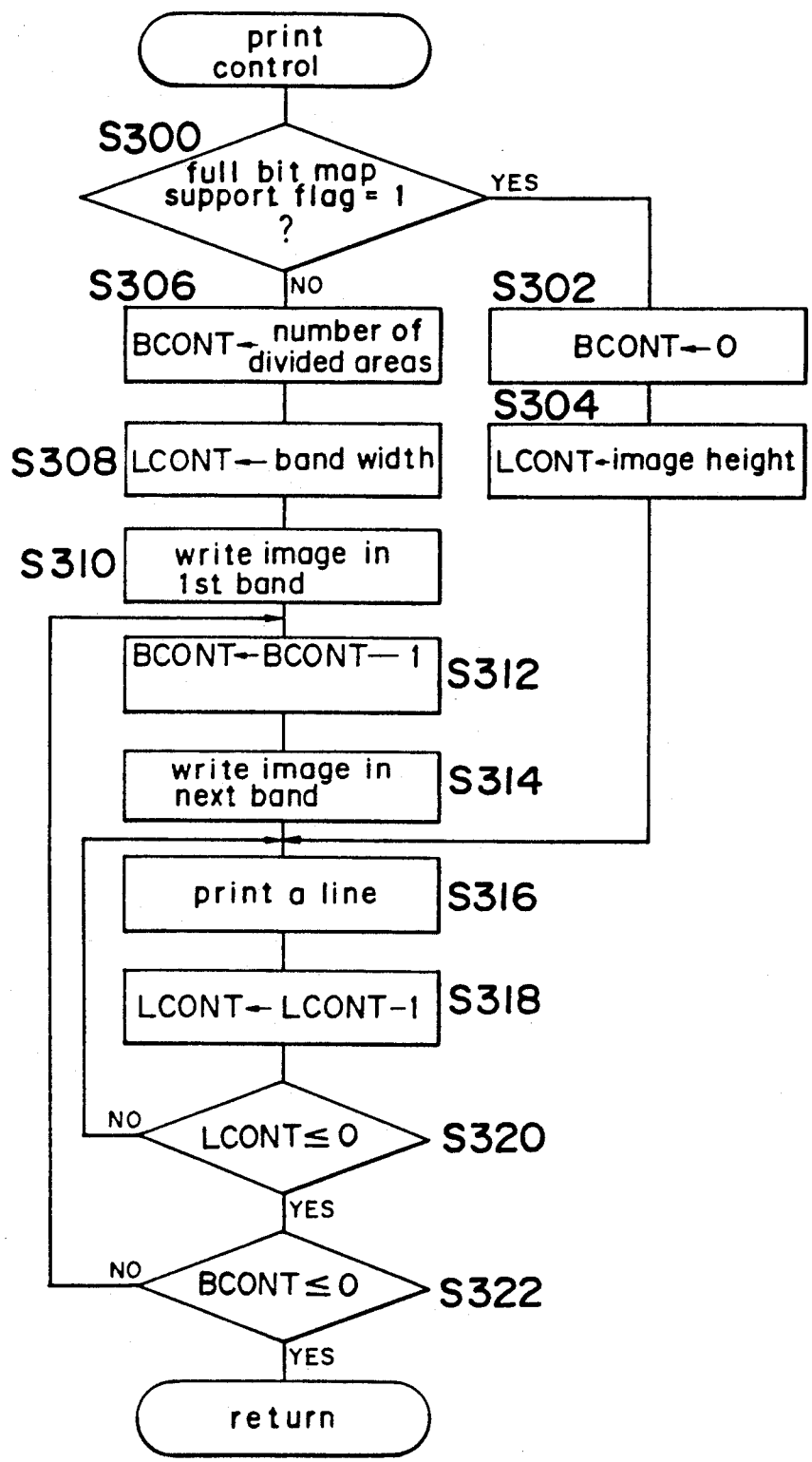
FIG. 15 is a flowchart of a print control routine.

FIG. 15 shows a routine for printing control indicated by S116 in FIG. 11.

First, it is decided from the full bit map support flag which of the full bit map mode and the strip map mode is set (step S300).

If it is decided that the strip map mode is selected (NO at step S300), the number of divided areas is set in a variable BCONT (step S306), and the number of lines (n) indicating the band width of the band buffer is set in a variable LCONT (step S308). The variables BCONT, LCONT are varied according to the size of the printing image.

Next, the printing pattern is read from the font memory for the character data or from the registering area for the graphic data by referring to the content of the packet buffer, so that either of them is then written to the first band buffer 308a (step S310).

Then, BCONT is decreased by one (step S312), and the printing pattern is started to be written in the next band buffer (the second band buffer 308b at present) (step S314).

The printing image of a line is printed from the band buffer (the first band buffer 308a at present) to which the pattern has been written (S316), and LCONT is decreased by one (step S318). This process is repeated until the image data in the band buffer is completely printed out, namely, until LCONT becomes zero (YES at step S320). The writing of the image to the next band buffer which has started at step S312 is carried out concurrently with printing process at steps S316–S320.

The operation in steps S312–S320 is repeated until the image data in the whole divided areas is printed, i.e., until BCONT becomes zero (YES at step S322).

If the full bit map mode is decided to be selected (YES at step S300), since it is not necessary to divide the area, BCONT is kept zero (step S302) and the total number of lines of the printing image is set in LCONT (step S304). Then the flow proceeds to step S316 and the total lines are outputted to the print engine 4 (steps S316–S322).

As explained above, in a printer with a bit map memory, the image size inputted per every page is detected in order to decide if the whole image can be stored in the bit map memory or not. Then, the full bit map mode is employed as the printing mode when the total image is found to be able to be stored within the bit map memory, while the strip map mode is employed when the total image is found not to be able to be stored within the bit map memory.

Therefore, such a situation can be prevented that an image is printed in the strip map mode even when the full bit map mode can be adopted, and the printing speed is not lowered and the printing quality is not deteriorated. Moreover, it can be prevented that the full bit map mode is erroneously selected when it is impossible to use the mode to cause the missing of a part of image. According to the present invention, the above-mentioned advantages can be achieved without adding more memories or the like, so that the manufacturing cost can be lowered.

Although the present invention has been fully described by way of embodiments, this invention may be practiced or embodied in still other ways without departing from the spirit or essential character thereof, and the scope of the invention is indicated by the appended claims and all variations which come within the meaning of the claims are intended to be embraced therein.

What is claimed is:

1. A printer for printing bit data converted from code data, comprising:
    a buffer memory for storing said code data;
    a bit data memory which can store said bit data;
    converting means for converting the code data to bit data;
    means for comparing the size of an image to be printed with the capacity of said bit data memory and for setting a first memory control mode when said image size is smaller than the capacity of said bit data memory, while setting a second memory control mode when said image size is larger than the capacity of the bit data memory; and
    memory control means for control writing/reading of bit data in or from said bit data memory;
    wherein said memory control means outputs bit data of one page to printing means after the bit data of one page is stored in said bit data memory in the first memory control mode, while said memory control means set a plurality of band areas within said bit data memory so as to write or read bit data cyclically to the plurality of band areas in the second memory control mode.

2. A printer as set forth in claim 1, wherein said plurality of band areas consist of two band areas, and the bit data is alternately written to or read from said two band areas.

3. A printer as set forth in claim 1, wherein said converting means includes a font memory with reference to which a character code data is converted to a bit data.

4. A printer as set forth in claim 1, wherein said bit data memory is a memory area allocated in a memory having a capacity larger than the memory area.

5. A printer for printing bit data converted from code data, comprising:
    means for analyzing said code data and for outputting the size of an image of one page and the bit data of the image of one page;
    a bit data memory for storing bit data;
    printing means for successively receiving bit data from said bit data memory to print the bit data;
    means for deciding if the capacity of said bit data memory is large than the size of the image of one page;
    a first control means for converting the code data of the image of one page to bit data, for storing the bit data in said bit data memory, and for outputting successively the bit data to said printing means, when the capacity of said bit data memory is larger than the size of the image of one page; and
    a second control means for setting a first memory area and a second memory area each smaller than the size of the image of one page in said bit data memory, and for converting the code data to bit data to store the bit data in one of the two memory areas while outputting bit data from the other of the two memory areas so that write and read of bit data in and from the memory areas are performed alternately when the capacity of said bit data memory is smaller than the size of image of one page.

6. A printer as set forth in claim 5, wherein said bit data memory is a memory area allocated in a memory having a capacity larger than the memory area.

7. A printer for printing bit data converted from code data, comprising:
    a buffer memory for storing code data of an image;
    converting means for converting code data read from said buffer memory to bit data;
    a bit map memory for storing said converted bit data;
    printing means for printing bit data on a sheet of paper;
    reading/writing means for writing the bit data from said converting means to said bit map memory, and for reading the bit data from said bit map memory to supply the bit data to said printing means;
    means for confirming the amount of the bit data of one page; and
    selecting means for selecting a first control mode or a second control mode according as the capacity of said bit map memory is larger than the amount of the bit data of one page or not;
    wherein in the first control mode, the bit data of one page is, after being converted and stored in said bit map memory beforehand, successively outputted from said bit map memory to said printing means, while in the second control mode, the bit data is successively read from said bit map memory to be supplied to said printing means as the code data is successively converted to bit data and written in said bit map memory when said converting means and reading/writing means are operated simultaneously.

8. A printer as set forth in claim 7, wherein said bit data memory is a memory area allocated in a memory having a capacity larger than the memory area.

9. A printing method, comprising the steps:
    obtaining the size of an image of one page to be printed;
    deciding if the data of the image size of one page is smaller than the capacity of a bit map memory for storing bit data; and
    performing first processing if the data of the size of one page is decided to be smaller than the capacity of the bit map memory in the deciding step, which first processing including the steps of: converting code data to bit data of one page, storing the converted bit data to the bit map memory, and outputting the stored bit data to printing means; while performing second processing if the data of the size of one page is decided not to be smaller than the capacity of the bit map memory in the deciding step, which second processing including the steps of setting a plurality of memory areas in said bit map memory, writing bit data in a memory area while supplying the bit data which has been written in one of the other memory areas.

10. A printing method as set forth in claim 9, wherein said bit data memory is a memory area allocated in a memory having a capacity larger than the memory area.

11. A printing method, comprising the steps of:

receiving code data;

obtaining the image size of one page from the code data;

deciding if the obtained size of the image of one page is smaller than the capacity of a bit map memory for storing bit data;

performing first processing if the obtained size of the image of one page is decided to be smaller than the capacity of the bit map memory in the deciding step, the first processing including the steps of (A1) converting the code data to bit data of one page and storing the converted bit data in the bit map memory, and (A2) outputting the stored bit data to printing means; while performing second processing if the obtained size of the image of one page is decided not to be smaller than the capacity of the bit map memory in the deciding step, the second processing including the steps of (B1) setting a first and a second memory areas in said map memory, (B2) converting code data of an amount to be able to be stored in a memory area to bit data and storing the converted bit data in the first memory area, (B3) converting code data of an amount to be able to be stored in a memory area to bit data and storing the converted bit data in the second memory area while outputting the bit data from said first memory area to said printing means, (B4) converting code data of an amount to be able to be stored in a memory area to bit data and storing the converted bit data in the first memory area while outputting the bit data from the second memory area to the printing means, and (B5) alternately repeating said steps (B3) and (B4).

12. A printing method as set forth in claim 11, wherein said bit data memory is a memory area allocated in a memory having a capacity larger than the memory area.

* * * * *